April 24, 1928.

G. J. MEAD

VULCANIZATION OF TIRE CASINGS

Filed July 26, 1926

1,667,127

GEORGE J. MEAD
Inventor

By Robert O. Harvey
Attorney

Patented Apr. 24, 1928.

1,667,127

UNITED STATES PATENT OFFICE.

GEORGE J. MEAD, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

VULCANIZATION OF TIRE CASINGS.

Application filed July 26, 1926. Serial No. 125,063.

My invention relates to vulcanizing tire casings and more particularly to a method and rigid core for vulcanizing casings of the cord type. Rigid cores for this purpose are usually smaller in cross section than the interior cross section of the casing, when the latter is expanded against the walls of the surrounding mold, so as to leave a space between the surface of the core and the casing. The core shell is provided with a plurality of holes so that when fluid pressure is admitted to the interior of the core through a suitable valve or stem the casing is forced under fluid pressure against the mold and the rubber tread flows into the design cavities of the mold.

It is among the objects of my invention to provide a core of this type which will assure a uniform and quick expansion of the casing against the mold and provide a circulation of the pressure fluid such that when a vulcanizing medium such as steam is used for that purpose the curing action will be uniform and the period of cure substantially shortened. Other and further objects will be apparent from the following specification and claims:

In the accompanying drawings which illustrate one embodiment of my invention

Figure 1:
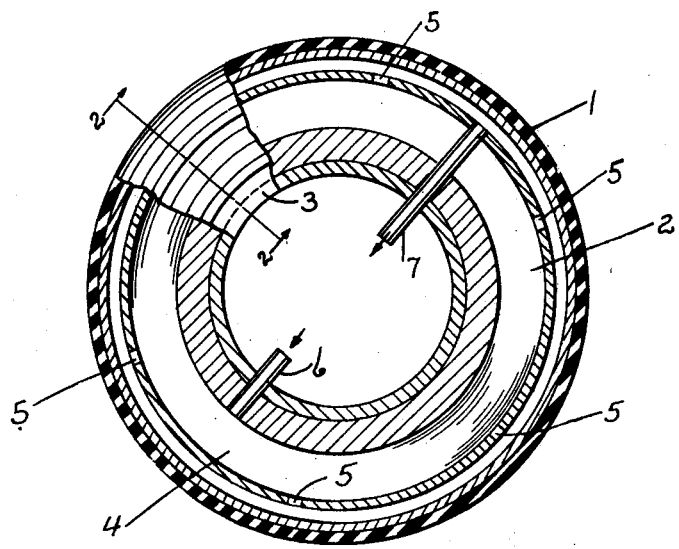
Fig. 1 is a side view of the core mainly in cross section.
Figure 2:
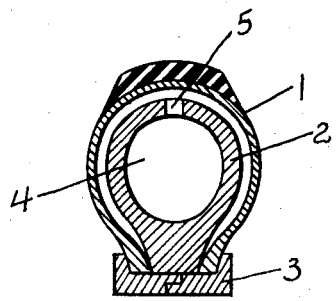
Fig. 2 is a sectional view on line 2—2 of Figure 1.

Referring to the drawings 1 designates the tire casing, 2 the core and 3 the bead rings all of which may be of any conventional shape. The cavity of the core is indicated at 4 and the apertures of the core shell are shown at 5. In the base of the core I provide an inlet valve or stem 6 and I further provide an outlet valve or stem 7 which passes through the base and cavity of the core and opens into the space between the surface of the core and the casing mounted thereon as shown in Figure 1. The assembly as shown in the drawings is placed in a suitable mold and subjected to vulcanizing temperature. Steam, or other fluid, under pressure, sufficient to mold or shape the casing enters stem 6, circulates in the core and through apertures 5 to the space between the core and casing and is discharged through stem 7. The fluid from stem 7 may be returned to the source of supply or may be vented to the atmosphere in which case stem 7 takes the form of a restricted opening substantially smaller in cross section than the opening through stem 6 in order that the desired pressure may be maintained. In either event a positive circulation of the pressure fluid in the core cavity and in the space between the core and casing is assured. In the illustration shown the circulation of the fluid through the core first has the advantage that the maximum condensation of the fluid tends to take place within the core where the condensate can be more easily handled. Under certain circumstances however it may be desirable to reverse the flow of the fluid permitting it to enter stem 7 and escape through stem 6 and it will be understood that such procedure is considered within the broader aspect of my invention.

I claim:

1. A cord tire vulcanizing core of less cross section than the interior cross section of the casing to be vulcanized thereon, an annular cavity within the core, openings from said cavity to the surface of the core, a fluid pressure conduit opening from the inner circumference of the core to said cavity and a second conduit opening from the inner circumference of the core to the outer circumference thereof.

2. A cord tire vulcanizing core of less cross section than the interior cross section of the casing to be vulcanized thereon, an annular cavity within the core, openings from said cavity to the tread portion of the surface of the core, a fluid pressure conduit opening from the inner circumference of the core to said cavity and a second conduit opening from the inner circumference of the core and passing through said cavity to the outer circumference of the core.

In testimony whereof I have signed my name to the above specification.

GEORGE J. MEAD.